(12) United States Patent
Holtstiege et al.

(10) Patent No.: US 11,434,688 B2
(45) Date of Patent: Sep. 6, 2022

(54) INSULATING GLAZING UNIT

(71) Applicant: SAINT-GOBAIN GLASS FRANCE, Courbevoie (FR)

(72) Inventors: Thomas Holtstiege, Schwelm (DE); Alicia Dröge, Aachen (DE); Christian Effertz, Aachen (DE); Christopher Marjan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/055,793

(22) PCT Filed: May 8, 2019

(86) PCT No.: PCT/EP2019/061757
§ 371 (c)(1),
(2) Date: Nov. 16, 2020

(87) PCT Pub. No.: WO2019/219460
PCT Pub. Date: Nov. 21, 2019

(65) Prior Publication Data
US 2021/0230934 A1    Jul. 29, 2021

(30) Foreign Application Priority Data

May 14, 2018    (EP) .................................. 18172064

(51) Int. Cl.
*E06B 7/28*        (2006.01)
*E06B 1/12*        (2006.01)
(Continued)

(52) U.S. Cl.
CPC .................. *E06B 7/28* (2013.01); *E06B 1/12* (2013.01); *E06B 3/66309* (2013.01); *G06K 19/07758* (2013.01)

(58) Field of Classification Search
CPC .......... E06B 1/12; E06B 3/66309; E06B 7/28; G06K 19/07758; H04B 1/59; H01Q 1/1271

See application file for complete search history.

(56) References Cited

U.S. PATENT DOCUMENTS 8,384,520 B2 *   2/2013   Fourreau .............. B64C 1/1484
                                                      701/14
10,303,035 B2 *  5/2019   Brown ..................... E06B 9/24
(Continued)

FOREIGN PATENT DOCUMENTS

| AT | 408014 B | 8/2001 |
| AU | 2014327719 A1 | 2/2016 |

(Continued)

OTHER PUBLICATIONS

International Search Report as issued in International Patent Application No. PCT/EP2019/061757, dated Jul. 12, 2019.
(Continued)

*Primary Examiner* — Christine T Cajilig
(74) *Attorney, Agent, or Firm* — Pillsbury Winthrop Shaw Pittman LLP

(57) ABSTRACT

An insulating glazing unit, includes at least two glass panes and a circumferential spacer profile between them near their edges, for use in a window, a door, or a façade glazing, which has in each case an electrically conductive frame surrounding the edges of the insulating glazing, wherein at least one RFID transponder is attached to the insulating glazing unit as an identification element, wherein the at least one transponder is arranged at a corner of the insulating glazing unit.

16 Claims, 7 Drawing Sheets

Figure 1:
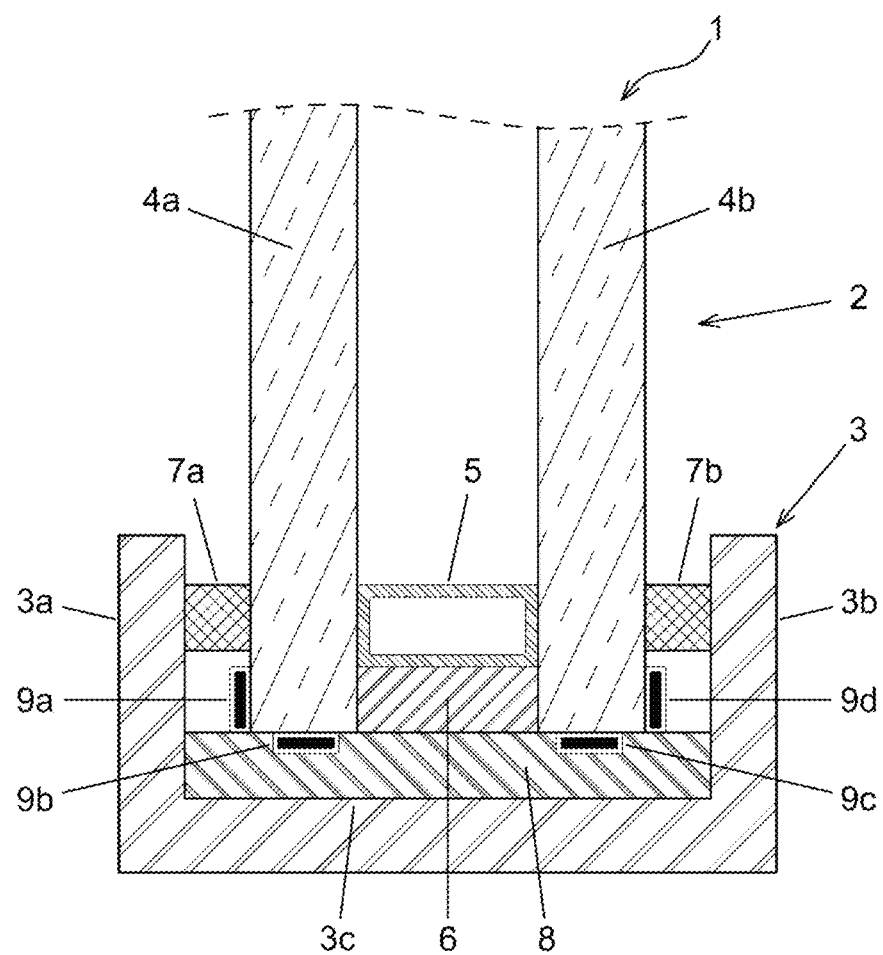

(51) Int. Cl.
*E06B 3/663* (2006.01)
*G06K 19/077* (2006.01)

(56) References Cited

U.S. PATENT DOCUMENTS

| | | | |
|---|---|---|---|
| 2008/0129499 A1* | 6/2008 | Masuzaka | G08B 13/04 340/545.1 |
| 2009/0243802 A1* | 10/2009 | Wolf | E06B 3/66309 156/60 |
| 2011/0133940 A1 | 6/2011 | Margalit et al. | |
| 2017/0167185 A1* | 6/2017 | Boer | E06B 1/6061 |
| 2017/0167186 A1* | 6/2017 | Messere | E06B 3/66314 |
| 2020/0082240 A1* | 3/2020 | Heitmar | E06B 7/28 |
| 2020/0193259 A1 | 6/2020 | Thangamani et al. | |

FOREIGN PATENT DOCUMENTS

| | | | |
|---|---|---|---|
| CN | 103649826 A | 3/2014 | |
| EP | 1 353 020 B1 | 6/2008 | |
| EP | 2 719 533 A1 | 4/2014 | |
| EP | 3 287 998 A1 | 2/2018 | |
| EP | 3287998 A1 * | 2/2018 | ........... E06B 3/6612 |
| FR | 2 787 134 A1 | 6/2000 | |
| FR | 2 787 135 A1 | 6/2000 | |
| FR | 2787135 A1 * | 6/2000 | ....... B32B 17/10036 |
| FR | 2 928 763 A1 | 9/2009 | |
| JP | 2010-224968 A | 10/2010 | |
| WO | WO 00/36261 A1 | 6/2000 | |
| WO | WO-0036261 A1 * | 6/2000 | ....... B32B 17/10036 |
| WO | WO 2007/137719 A1 | 12/2007 | |
| WO | WO 2019/219460 A1 | 11/2019 | |
| WO | WO 2019/219462 A1 | 11/2019 | |

OTHER PUBLICATIONS

Examination Report as issued in Indian Patent Application No. 202017048110, dated Jan. 3, 2022.
First Office Action as issued in Chinese Patent Application No. 201980032223.7, dated Dec. 21, 2021.
Examination Report as issued in Indian Patent Application No. 202017048104, dated Jun. 2, 2021.
Examination Report as issued in Canadian Patent Application No. 3,099,085, dated Jan. 26, 2022.
Notice of Allowance as issued in U.S. Appl. No. 16/978,933, dated Jun. 2, 2022.

* cited by examiner

INSULATING GLAZING UNIT

CROSS-REFERENCE TO RELATED APPLICATIONS

This application is the U.S. National Stage of PCT/EP2019/061757, filed May 8, 2019, which in turn claims priority to European patent application number filed 18172064.0 filed May 14, 2018. The content of these applications are incorporated herein by reference in their entireties.

The invention relates to an insulating glazing unit that has at least two glass panes and a circumferential spacer profile between them near their edges for use in a window, a door, or a façade glazing, which has, in each case, a frame surrounding the edges of the insulating glazing, wherein at least one RFID transponder is attached to the insulating glazing unit as an identification element. It further relates to a window, a door, and a façade glazing, formed with such an insulating glazing unit.

Modern windows, doors, and façade glazings, at least for use in northern and temperate latitudes, are usually produced using prefabricated insulating glazing units that have the aforementioned structure, but, optionally, can include even more than two glass panes in the combination. Such insulating glazing units are mass-produced, shipped, and also independently marketed products that should be clearly identifiable on their way to an end product and possibly even during maintenance and servicing.

It is already known to provide insulating glazing units with such identifying markings and certain requirements of manufacturers and users have arisen in the related practice:

[1] The identifying marking should not be visible either from the inside or from the outside.

[2] The marking should be "readable" from a distance between 30 cm and 1 m.

[3] The marking should be as forgery-proof as possible, i.e., it should not be readily possible to overwrite or to copy it.

The effectiveness of conventional identifying markings, such as barcodes or QR codes, is based on their visibility, which means at least one restriction under the above aspect [1]. Meeting the requirement [2] is also difficult therewith. Protection against copying [3] cannot be ensured since barcodes and QR codes can be photographed. Furthermore, an RFID transponder can be protected with a password such that it cannot be overwritten or its radio capability destroyed without considerable effort.

It has also been proposed to provide insulating glazing units with "electronic" identifiers, in particular via radio readable identifiers, so-called "RFID (Radio Frequency IDentification) transponders". Such insulating glazing units are, for example, disclosed in WO 00/36261 A1 or WO 2007/137719 A1.

Certain types of window and door frames, but especially façade constructions in which insulating glazing units are installed are made entirely or at least partially of a metal or a metal alloy (aluminum, steel . . . ), which interrupts or at least greatly attenuates the passage of radio waves from or to the RFID transponder on the insulating glazing unit. For this reason, meeting the above requirement [2] has, in particular, proved difficult. Known insulating glazing units provided with RFID transponders are, consequently, not readily usable with metallic frame constructions. This reduces the potential range of application of glazing units identified in this manner and thus the acceptance of these marking solutions by manufacturers and users.

The object of the invention is, consequently, to provide an improved insulating glazing unit of the aforementioned type that is, in particular, not problematic for use even in frame constructions made at least to a considerable extent of an electrically conductive material, for example, a metal or a metal alloy and that also ensures meeting the aforementioned requirements in such installation situations, in particular fulfilling the requirement [2].

This object is accomplished by an insulating glazing unit with the features of claim 1, i.e., by the fact that at least one transponder is arranged at a corner of the insulating glazing unit. Expedient further developments of the idea of the invention are the subject matter of the dependent claims.

The invention thus relates to an insulating glazing unit that has at least two glass panes and a circumferential spacer profile between them near their edges for use in a window, a door, or a façade glazing, which has in each case an electrically conductive frame surrounding the edges of the insulating glazing, wherein at least one RFID transponder is attached to the insulating glazing unit as an identification element and the or at least one transponder is arranged at a corner of the insulating glazing unit.

The electrically conductive frame is, in particular, a metallic frame or a frame consisting at least partially of a metal or a metal alloy.

An arrangement of a transponder "at a corner" of the insulating glazing unit means, in particular, that the end of the transponder pointing toward the nearest corner of the insulating glazing unit is not more than 30 cm, preferably not more than 20 cm, particularly preferably not more than 10 cm, most particularly preferably not more than 5 cm from this corner of the insulating glazing unit.

The invention was developed as a result of extensive experimental investigations undertaken on insulating glazing units with the aforementioned basic structure, wherein, in particular, the spacer is a desiccant-filled hollow profile that is made of metal or is coated at least in sections with a metal foil, and wherein a (likewise circumferential) sealant strip is applied on the pane outer surface of the spacer profile. With regard to the application situation, the inventors carried out, in particular, investigations on insulating glazing units embedded in metallic frames, wherein spacers are positioned on the rebate base of the frame and elastomer sealing strips are arranged between the outer sides of the glass panes and the inner side of the adjacent upright frame rebates. Commercially available RFID transponders, whose structure and functionality are well known and, consequently, need not be further described here, were used in the investigations. The radio wavelengths used in such transponder systems are usually in the range between 125 kHz and 960 MHz (rarely between 2.45 GHz and 5.8 GHz) and penetrate both wood and conventional plastics but not metals. The findings of the inventors apply in principle to both passive and active RFID transponders.

With regard to electrically conductive frames, in particular metal frames, that surround an insulating glazing unit and that, based on elementary laws of physics and according to the knowledge of the person skilled in the art based thereon, should perceptibly interfere with, if not completely suppress, the HF radiation of RFID transponders placed near the edge or their antennas, the proposed solution is surprising. It yields the unforeseen advantage that an RFID transponder placed according to the invention can still be read without problems and reliably at a relatively large distance of 0.32 1 m, preferably 0.5 to 1 m, from a window, a door, or a façade glazing in which the insulating glazing unit is installed.

In one embodiment of the invention, the transponder is arranged at a predetermined corner, which is specified based on a predetermined installation position of the insulating glazing unit in the frame. The installation location of the transponder can, in particular, be identified by an identifying marking visible to the naked eye. This embodiment enables quickly identifying an installed insulating glazing unit, without having to search all corners as to whether the transponder delivering the identification is placed there or elsewhere.

In a preferred embodiment of the invention, two RFID transponders are arranged on the insulating glazing, with the transponders arranged such that a transponder is arranged in each case at two diagonally opposite corners.

In another embodiment, provision is made to arrange a transponder at each corner of the insulating glazing unit. This embodiment is somewhat more complicated to manufacture than the aforementioned and enables, as a result, quick identification of every insulating glazing unit so equipped regardless of whether specifications had been made for a prescribed installation position and whether these are actually complied with.

According to the invention, the or each transponder is arranged outside the gas-filled interpane space.

In another embodiment of the invention, the or each transponder is applied to the boundary edge of one of the glass panes. This embodiment has the advantage that the transponder is bonded to glass and a) consequently, does not have to be so thick in order to ensure the distance from a metal surface of a spacer, b) it is thus also not incorporated into the insulating glazing unit (IGU) and does not affect its quality (e.g., in terms of stiffness), and c) the transponder is not embedded in the sealant and thus the operating frequency does not shift. This is important in order to achieve optimum reading ranges. Alternatively, but with similarly advantageous effect, in another embodiment, the or each transponder is applied to the outer surface of the spacer profile.

In another embodiment, the RFID transponder is electromagnetically coupled to a conductive spacer profile or to a conductive section of such a profile such that the emission and reception properties of the entire system (transponder-IGU-spacer profile-frame) are improved. In this embodiment, the conductive spacer profile or the conductive section of such a profile acts, for example, as an antenna of the transponder.

In another alternative embodiment, the or each transponder is applied to an outer surface of one of the glass panes at its edge. In manner particularly desirable aesthetically, the transponder is dimensioned and placed on the edge such that, in the mounted state of the window, of the door, or of the façade glazing, it is completely covered by an upright rebate wall of the surrounding electrically conductive, in particular metallic, frame.

In another embodiment of the invention, at the location of the transponder, an identifying marking visible to the naked eye is applied on at least one glass pane.

The invention also relates to a window or a door with an electrically conductive frame and an insulating glazing unit according to the invention inserted into the electrically conductive frame.

Furthermore, the invention relates to a façade glazing with a construction that has an electrically conductive frame and an insulating glazing unit according to the invention inserted into the electrically conductive frame.

Figure 2A:
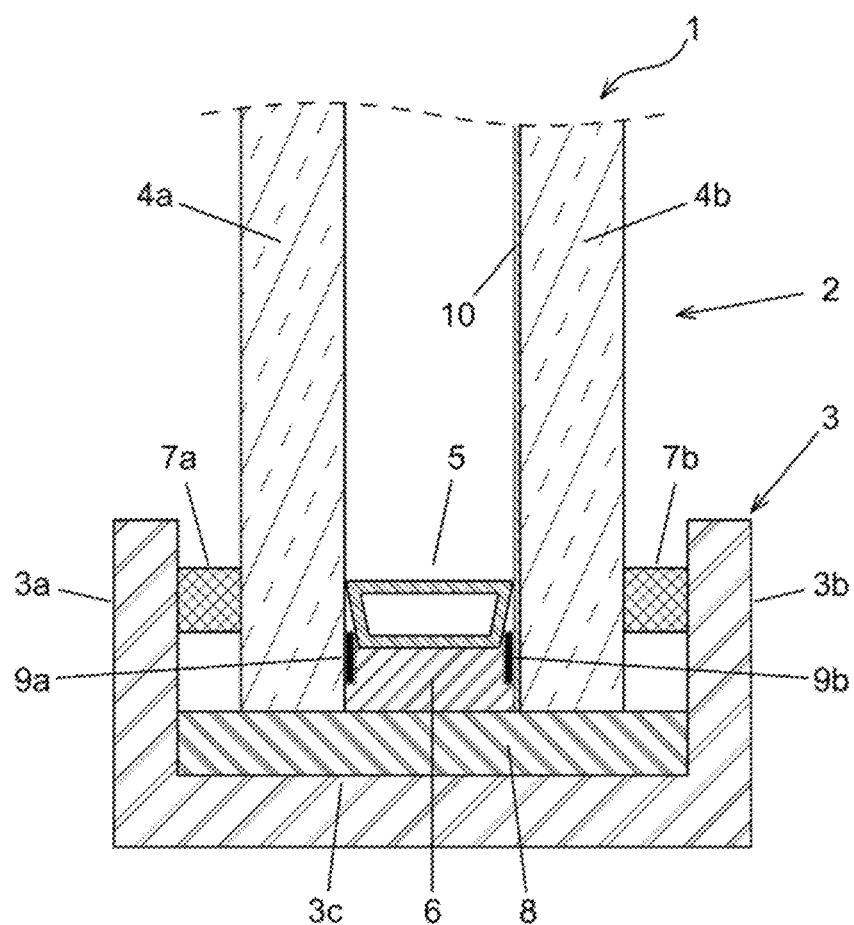
Figure 2B:
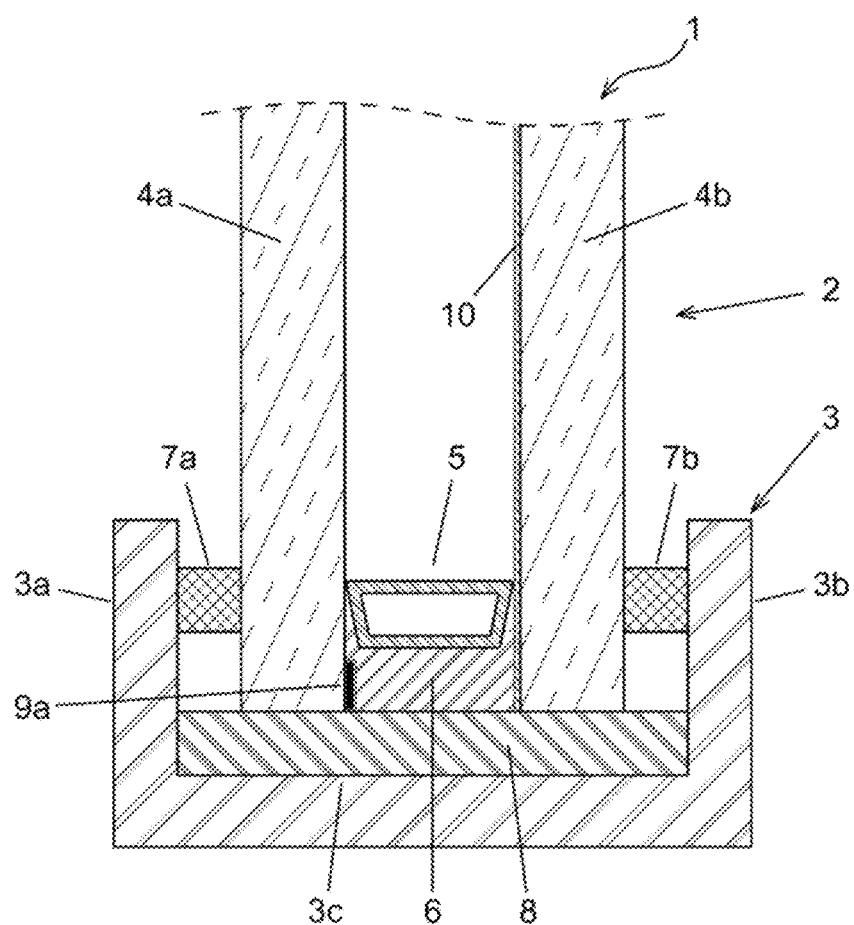
Figure 3:
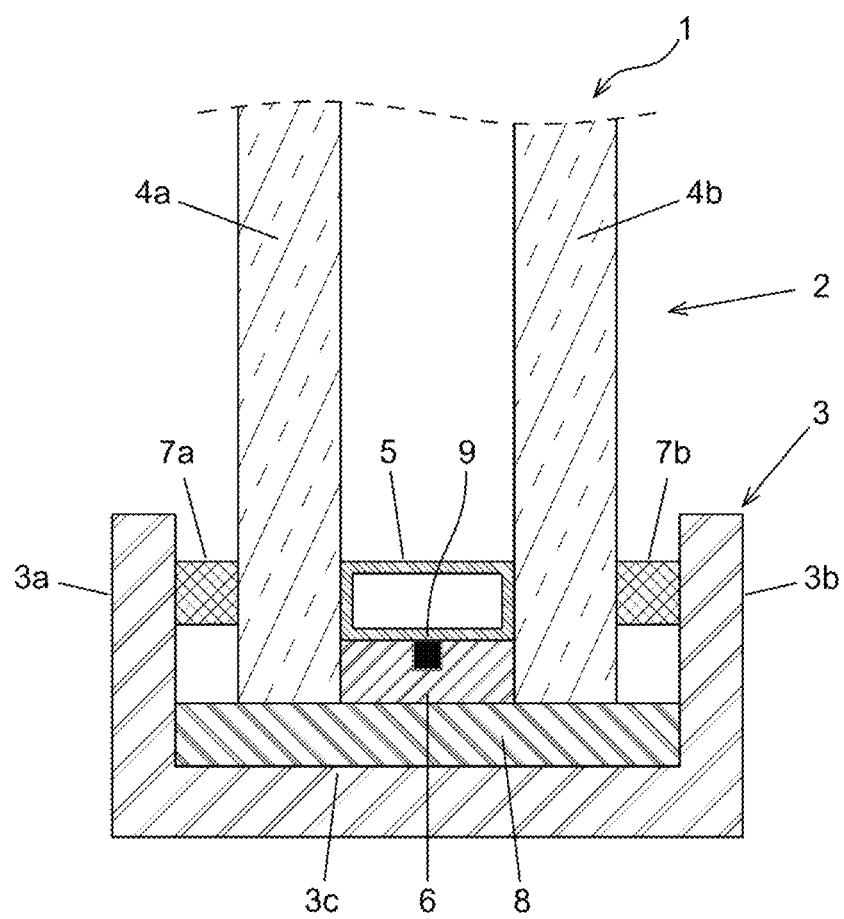
Figure 4:
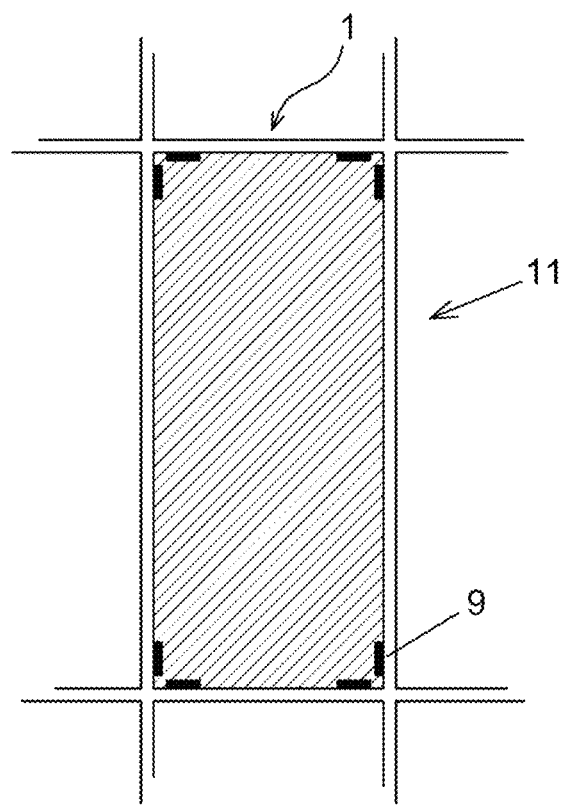
Figure 5:
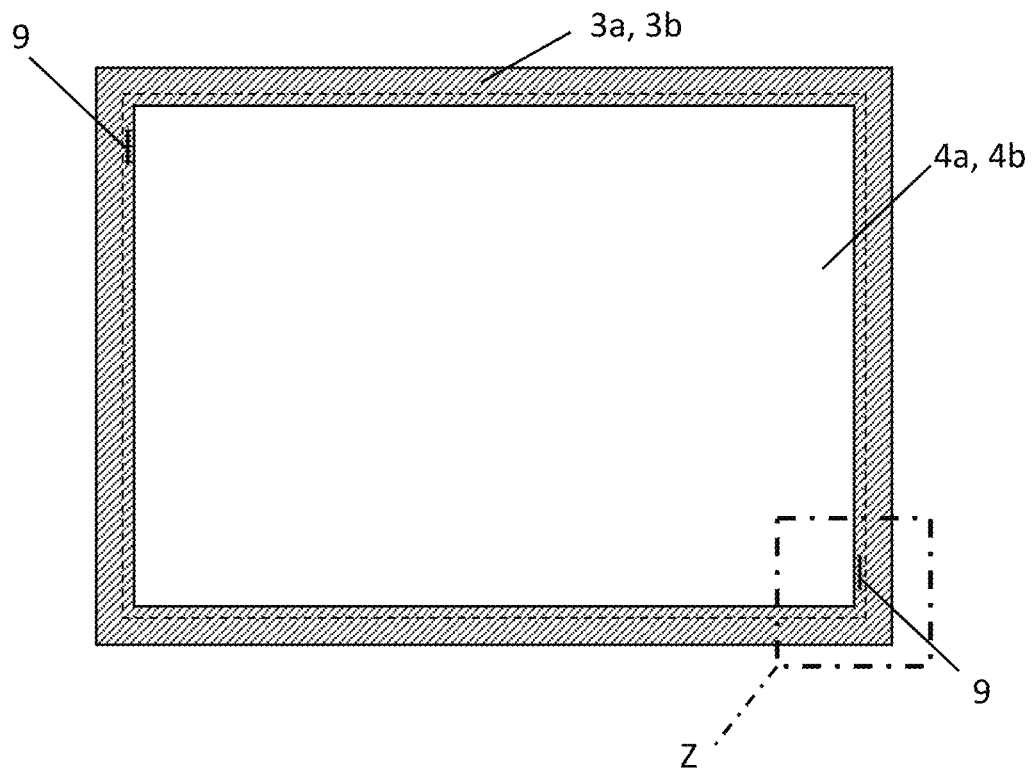
Figure 6:
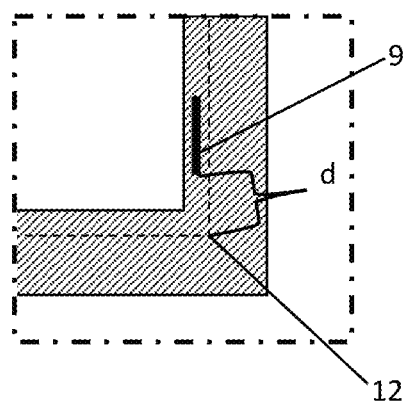
Figure 7:
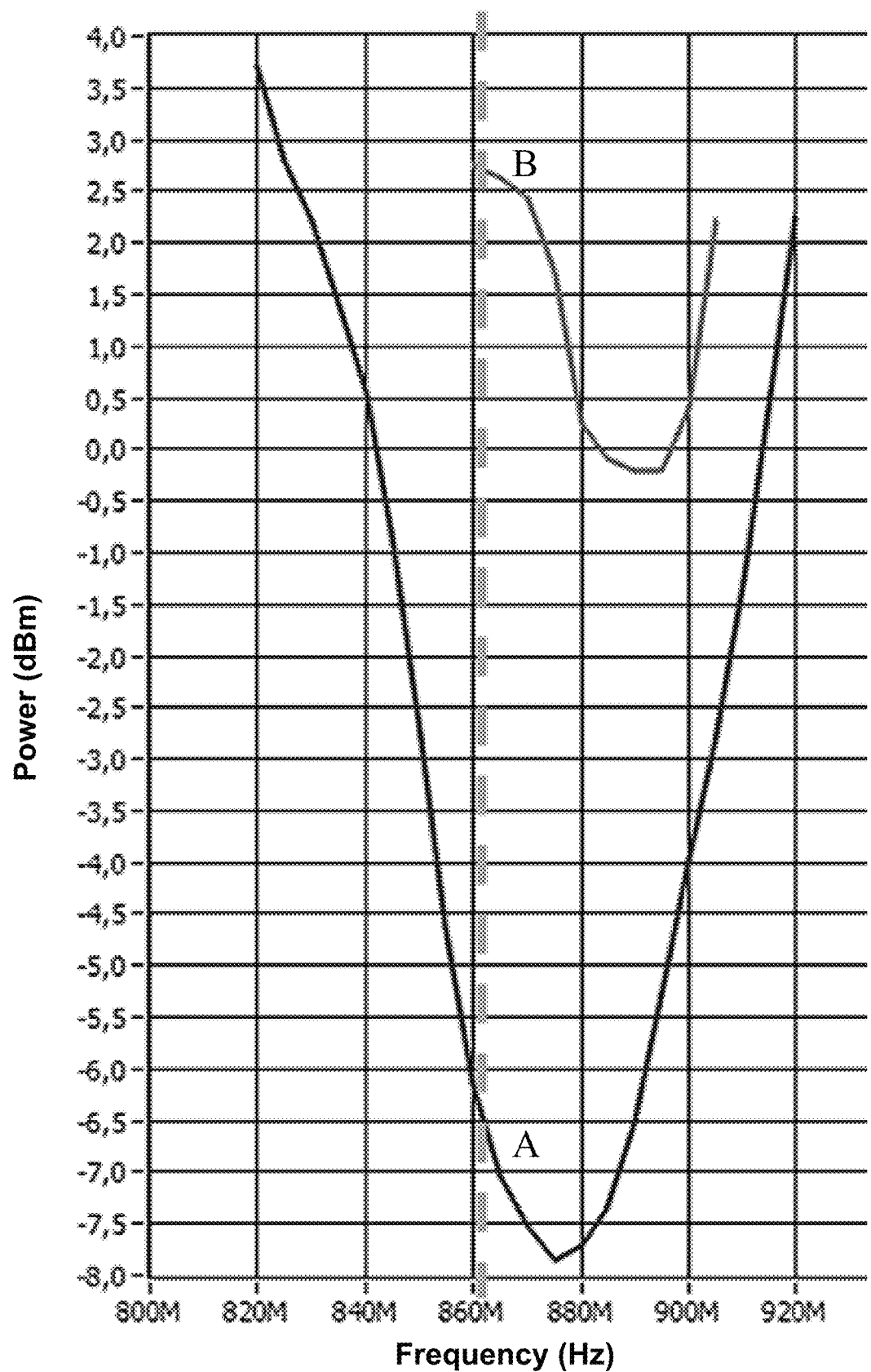

Advantages and functionalities of the invention are also evident from the following description of exemplary embodiments with reference to the figures. They depict:

FIG. 1 a detailed view (cross-sectional representation) of an edge region of a window in which an insulating glazing unit in accordance with an embodiment of the invention is installed, FIG. 2A a detailed view (cross-sectional representation) of an edge region of a window in which an insulating glazing unit in accordance with another embodiment of the invention is installed, FIG. 2B a detailed view (cross-sectional representation) of an edge region of a window in which an insulating glazing unit in accordance with another embodiment of the invention is installed, FIG. 3 a detailed view (cross-sectional representation) of an edge region of a window in which an insulating glazing unit in accordance with another embodiment of the invention is installed, FIG. 4 a schematic representation (plan view) of a section of a façade glazing in which an insulating glazing unit according to the invention is installed, FIG. 5 a schematic representation (plan view) of a window with an insulating glazing unit according to the invention, FIG. 6 an enlarged representation of the region Z of FIG. 5, and FIG. 7 a diagram for comparing the power required for activating a transponder arranged at a corner as a function of frequency with the power required for activating a transponder arranged centrally at the edge as a function of frequency.

In the figures as well as the following description, the insulating glazing units as well as the window and the individual components are in each case identified with the same reference characters regardless of the fact that the specific embodiments differ.

FIG. 1 depicts an edge region of an insulating glazing unit 1, inserted into a metal frame 3 substantially U-shaped in cross-section and surrounding the end face of the insulating glazing unit as parts of an insulating window 2.

In this embodiment, the insulating glazing unit 1 comprises two glass panes 4a and 4b that are held apart at a predetermined distance by a spacer profile 5 placed between the glass panes near the end face of the insulating glazing unit. The spacer profile 5 is usually hollow and filled with a desiccant (not shown) that, via small openings (also not shown) on the inside, binds any moisture that has penetrated into the interpane space. The interpane space between the glass panes 4a and 4b is evacuated or filled with a noble gas, such as argon. An elastomer seal (sealing profile) 6 is introduced in the edge region of the insulating glazing unit 1, between the glass panes 4a and 4b and outside the spacer profile 5. This is shown here, simplified, as one piece. In practice, it usually comprises two components, one of which seals between spacers and glass and the other also additionally stabilizes the insulating glazing unit.

In the embodiment depicted in FIG. 1, the respective intermediate space between the two upright rebate walls 3a, 3b of the frame 3 and the adjacent glass pane 4a or 4b is also sealed with an elastomer profile 7a or 7b. In the rebate base 3c of the frame 3, spacers 8 are positioned at specified points of the longitudinal extension of the frame, which spacers extend substantially over the complete width of the rebate base 3c and thus completely support the end face of the insulating glazing unit 1 in a point-wise manner. Such spacers are usually manufactured from a plastic that is firm but not brittle, also flexible at points up to certain extent.

The insulating glazing unit 1 of FIG. 1 is, by way of example, provided with a total of four RFID transponders 9a to 9d. Of these, the transponders 9a and 9d are applied at the edge of the glass pane 4a or 4b on their outer surface, in each case, whereas the transponders 9b and 9c are applied on the boundary edge of the glass panes 4a and 4b respectively, i.e., are seated on the end face of the insulating glazing unit. This exemplary arrangement serves to illustrate the mounting possibilities of the transponders with an insulating glazing unit in accordance with a first embodiment of the invention; in practice, normally only one or two of the possible mounting positions shown here will be occupied. When mounted on the pane surface, the or each transponder can also be at some distance from the edge.

FIG. 2A depicts a modified construction in which the glass pane 4b has an interior-side coating (possibly a thermal protection coating) 10 that can cover the glass completely or only partially.

In the case of this embodiment, two transponders 9a, 9b are depicted, applied in each case on the interior-side surfaces of the glass panes 4a or 4b, and, in fact, in the edge region between the spacer profile 5 and the sealing profile 6 sealing the insulating glazing unit. Since the spacer profile 5 is, in this embodiment, trapezoidal in cross-section, i.e., somewhat tapered toward the end edge of the insulating glazing unit, there is, at that location, a small gap relative to the adjacent glass surface into which transponders can be partially inserted. Here again, in practice, only one of the two mounting positions will normally be occupied by a transponder. With this construction, an electromagnetic coupling is created between the transponder and the spacer, which now acts as an antenna and increases the signal strength between the reading device and the transponder. Here, the amplifying effect is a function of the distance of the transponder from the spacer.

FIG. 2B depicts another modified construction in which the glass pane 4b has an interior-side coating 10, which can cover the glass completely or only partially.

In this embodiment, only one transponder 9a is depicted. The transponder 9a is arranged on the interior-side surface of the glass pane 4a and, in fact, between the sealing profile 6 sealing the insulating glazing unit and the glass pane 4a. The transponder 9a makes no contact with the spacer profile 5, but, on the contrary, should be as far from it as possible.

FIG. 3 depicts a modification of the window structure shown in FIG. 2A and FIG. 2B and described above, whose substantial difference is the provision of a single RFID transponder 9 and its positioning centrally between the glass panes 4a and 4b at the outer surface of the spacer profile 5, embedded in the adjacent surface of the sealing profile 6.

FIG. 4 depicts schematically, using the example of a façade glazing 10, the attachment of transponders 9 in the corner regions of an insulating glazing unit 1. Investigations by the inventors showed that such an arrangement has a positive effect on the reception/transmission characteristics and increases the achievable reading distance of the transponders. As depicted in the figure, transponders with an elongated housing can be attached in the vicinity of the corners both on the long and the short sides of the insulating glazing unit, and, in fact, in principle in any of the ways shown in FIGS. 1 to 3 and described above.

FIG. 5 depicts a schematic representation (plan view) of a window comprising an insulating glazing unit 1 according to the invention arranged in an electrically conductive frame, in which two transponders are arranged diagonally opposite one another, at a corner in each case. For better illustration, the upright rebate walls 3a, 3b of the frame are shown in section such that the transponders 9 are discernible in FIG. 5. The circumferential side edge of the glass panes 4a, 4b is shown in dashed lines in FIG. 5.

FIG. 6 depicts an enlarged representation of the region Z of FIG. 5. In FIG. 6, the distance between the end of the transponder 9 pointing toward the nearest corner 12 of the insulating glazing unit 1 and the corner 12 of the insulating glazing unit 1 is provided with the reference character d. The distance d is preferably 5 to 30 cm, for example, 10 cm.

FIG. 7 shows a diagram for comparing the power required for activating a transponder arranged at a corner as a function of frequency with the power required for activating a transponder arranged centrally at the edge as a function of frequency.

For the comparison test, an insulating glazing unit with a width of 50 cm and a height of 180 cm was provided, in which two RFID transponders were embedded. One of the transponders was embedded on one of the long sides at a corner, i.e., approx. 20 cm from the corner, the other transponder was embedded centrally on this long side, i.e., approx. 80 cm from the corner, with the transponders embedded in each case analogously to FIG. 3.

The curve measured for the transponder arranged at the corner is identified with A in FIG. 7; the curve measured for the centrally arranged transponder is identified with B in FIG. 7. The frequency of 865 MHz to 868 MHz approved in the European Union for UHF (ultra high frequency) RFID applications is identified in FIG. 7 with the dashed line.

It can be seen from FIG. 7 that at the relevant frequency of 865 MHz, the centrally arranged transponder requires power of 2.7 decibel milliwatts (dBm)≈1.8 mW, whereas the transponder arranged at a corner requires power of −6 dBm≈0.25 mW. Thus, the centrally arranged transponder requires approx. nine times the power of the transponder that is arranged at the corners. This has a major impact on the reading distance of the transponder. The higher the power required, the shorter the possible reading distance. The lower the power required, the greater the possible reading distance.

In another comparative example, an insulating glazing unit with a width of 40 cm and a height of 350 cm arranged in a metal frame was provided, in which two RFID transponders were embedded and the reading distance was determined. One of the transponders was embedded on one of the long sides at a corner; the other transponder was embedded centrally on this long side far from the corner, with the transponders embedded analogously to FIG. 3 in each case.

The reading distance of the transponder arranged at the corner was 30 cm, whereas the reading distance of the centrally arranged transponder was only 5 cm. Thus, the corner acts as an amplifier for the signal.

The embodiment of the invention is not restricted to the above-described examples and highlighted aspects of the embodiments, but is also possible in a large number of modifications that are evident to the person skilled in the art from the dependent claims.

LIST OF REFERENCE CHARACTERS 1 insulating glazing unit
2 window
3 frame
3a, 3b upright rebate walls
3c rebate base
4a, 4b glass panes
5 spacer profile 6 sealing profile of the insulating glazing unit
7a, 7b elastomer profile on the frame
8 spacer
9, 9a-9d RFID transponder
10 coating
11 façade glazing
12 corner
Z region Z
d distance

The invention claimed is:

1. An insulating glazing unit, comprising at least two glass panes and a circumferential spacer profile between the at least two glass panes near edges of the at least two glass panes, for use in a window, a door, or a façade glazing, which has in each case an electrically conductive frame surrounding the edges of the insulating glazing,
 wherein at least one RFID transponder is attached to the insulating glazing unit as an identification element, and
 wherein the at least one RFID transponder is arranged at a corner of the insulating glazing unit, and
 wherein the at least one RFID transponder is electromagnetically coupled to a conductive spacer profile or to a conductive section of the conductive spacer profile such that emission and reception properties of an entire system (transponder IGU spacer profile frame) are improved.

2. The insulating glazing unit according to claim 1, wherein the at least one RFID transponder is arranged at a predetermined corner, which is specified based on a predetermined installation position of the insulating glazing unit in the electrically conductive frame.

3. The insulating glazing unit according to claim 1, wherein a RFID transponder of the at least one RFID transponder is arranged in each case at two diagonally opposite corners.

4. The insulating glazing unit according to claim 1, wherein a RFID transponder of the at least one RFID transponder is arranged at each corner of the insulating glazing unit.

5. The insulating glazing unit according to claim 1, wherein in the case of the at least one RFID transponder, an end of the transponder pointing toward the nearest corner of the insulating glazing unit is not more than 30 cm from the nearest corner of the insulating glazing unit.

6. The insulating glazing unit according to claim 1, wherein the at least one RFID transponder is applied to a boundary edge of one of the glass panes.

7. The insulating glazing unit according to claim 1, wherein the at least one RFID transponder is applied to an outer surface of the spacer profile.

8. The insulating glazing unit according to claim 1, wherein the at least one RFID transponder is applied to an outer surface of one of the glass panes at the edge thereof.

9. The insulating glazing unit according to claim 8, wherein the at least one RFID transponder is dimensioned and placed on the edge such that, in the mounted state of the window, of the door, or of the façade glazing, the at least one RFID transponder is completely covered by an upright rebate wall of the surrounding electrically conductive frame.

10. The insulating glazing unit according to claim 1, wherein at a location of the at least one RFID transponder an identifying marking visible to the naked eye is applied on at least one of the at least two glass panes.

11. A window comprising the electrically conductive frame and the insulating glazing unit according to claim 1, the insulating glazing unit being inserted into the electrically conductive frame.

12. A door comprising the electrically conductive frame and the insulating glazing unit according to claim 1, the insulating glazing unit being inserted into the electrically conductive frame.

13. A façade glazing with a construction that comprises the electrically conductive frame and the insulating glazing unit according to claim 1, the insulating glazing unit being inserted into the electrically conductive frame.

14. The insulating glazing unit according to claim 5, wherein the end of the transponder pointing toward the nearest corner of the insulating glazing unit is not more than 20 cm from the nearest corner of the insulating glazing unit.

15. The insulating glazing unit according to claim 14, wherein the end of the transponder pointing toward the nearest corner of the insulating glazing unit is not more than 10 cm from the nearest corner of the insulating glazing unit.

16. The insulating glazing unit according to claim 15, wherein the end of the transponder pointing toward the nearest corner of the insulating glazing unit is not more than 5 cm from the nearest corner of the insulating glazing unit.

* * * * *